United States Patent [19]

Boyd

[11] 4,142,732
[45] Mar. 6, 1979

[54] HAND TRUCK

[76] Inventor: Arthur C. Boyd, 53-1/2 S. Bates, Akron, Ohio 44303

[21] Appl. No.: 827,101

[22] Filed: Aug. 23, 1977

[51] Int. Cl.$^2$ .............................................. B62B 5/02
[52] U.S. Cl. ..................................... 280/5.26; 188/22; 188/77 R
[58] Field of Search ................ 280/5.26, 5.28, 5.32; 180/8 A; 188/77 R, 22, 19, 17, 26

[56] References Cited

U.S. PATENT DOCUMENTS

| 672,152 | 4/1901 | Ruher | 280/5.28 |
|---|---|---|---|
| 843,034 | 2/1907 | Ridgway | 280/5.26 |
| 849,270 | 4/1907 | Schafer | 280/5.26 |
| 1,347,990 | 7/1920 | Carter | 188/77 R |
| 1,546,492 | 7/1925 | Kelley | 188/77 R |
| 1,807,913 | 6/1931 | Hollowood | 280/5.28 |
| 1,969,048 | 8/1934 | Smith | 280/5.28 |
| 2,651,525 | 9/1953 | Achee | 280/5.32 |
| 2,689,742 | 9/1954 | Gemeinhardt | 280/5.32 |
| 2,706,640 | 4/1955 | Marshall | 280/5.26 |
| 2,736,564 | 2/1956 | Loam et al. | 280/5.26 |
| 3,058,754 | 10/1962 | Whitaker | 280/5.26 |
| 3,326,563 | 6/1967 | Whitaker | 280/5.26 |
| 3,346,269 | 10/1967 | Soto | 280/5.26 |
| 3,788,413 | 1/1974 | Miller | 280/5.32 X |

Primary Examiner—John A. Pekar
Attorney, Agent, or Firm—Reese Taylor

[57] ABSTRACT

Disclosed herein is an improved hand truck having stair climbing capabilities of the general type employing a pair of star-like plates journaled on a main axle and carrying a plurality of stub axles on the projecting legs of the plate with each axle carrying a wheel to facilitate ascending or descending stairs. The type of truck in question operates so that one of the wheels will be in contact with the lands of two adjacent steps at all times to avoid jarring and to facilitate movement. The improvement disclosed includes the provision of braking means which will prevent "free-wheeling" of the plate so as to effectively slow up movement of the truck particularly when descending. The brake is operated from the handle end of the truck and releasably engages the main axle to either permit or prevent "free-wheeling" of the star-like plates to thereby selectively inhibit movement of the truck.

10 Claims, 8 Drawing Figures

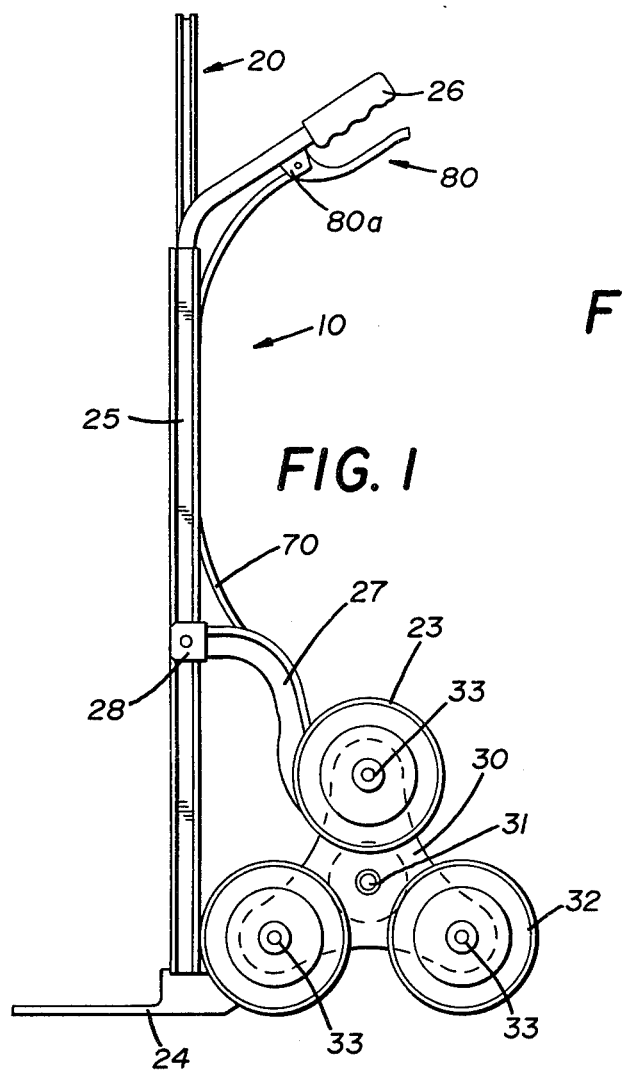
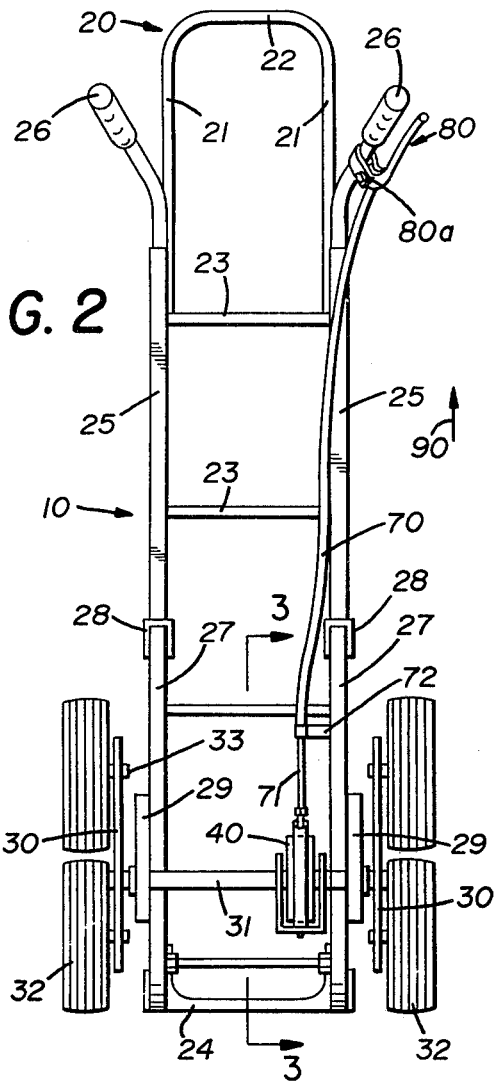
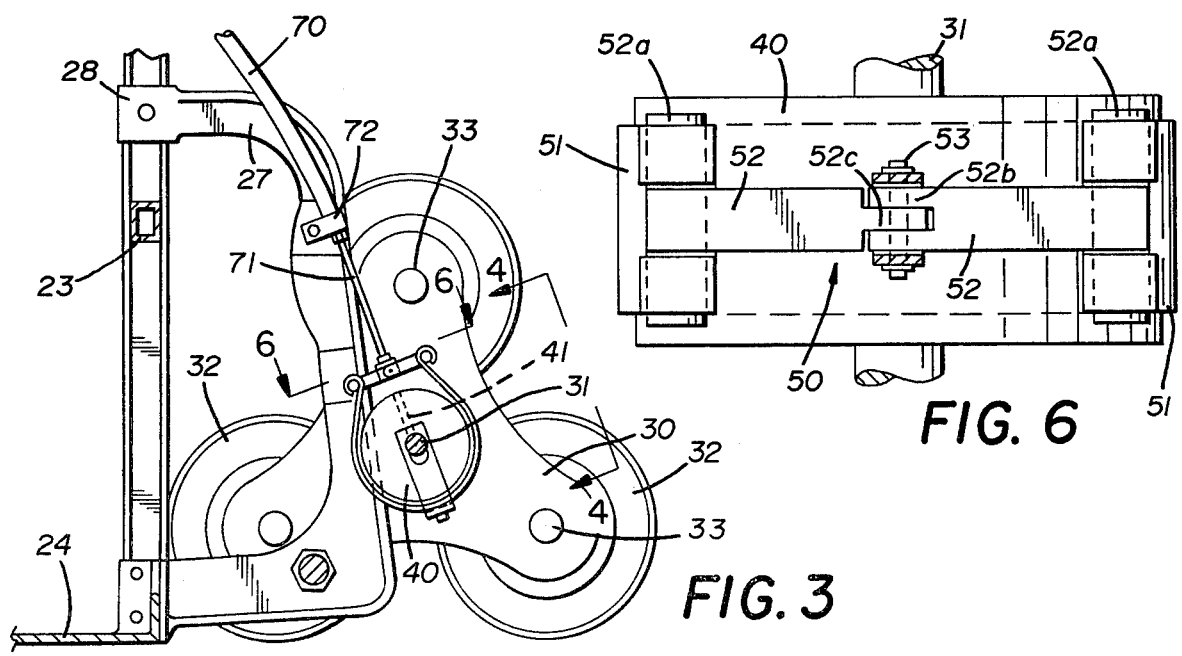

HAND TRUCK

FIELD OF THE INVENTION

This invention, in general, relates to hand propelled vehicles in the nature of moving dollies or trucks and, in particular, relates to a type of dolly, commonly referred to as a hand truck, and including an elongate frame having a load carrying portion at one end and handle portion at the other and having wheels adjacent the load carrying end.

PRIOR ART STATEMENT

Dollies or hand trucks of the type generally involved in this application are well known in the art and generally include an elongate vertical frame terminating at its lower or bottom end in a load carrying member and at the top end in handles. Adjacent the bottom end normally are a pair of opposed wheels so that when the frame is tilted out of vertical condition the device can be propelled along a surface.

There are certain inherent disadvantages in structures of this type particularly when used to ascend or descend stairs. In the descent, of course, effectively the wheels are pushed off of one land area and permitted to simply drop to the next one. This is quite strenuous on the operator and also can lead to damage to the vehicle and the stairs. The same difficulties are encountered in ascending stairs in that the wheel must be pulled up along the riser and on to the next succeeding land area.

The prior art has recognized these difficulties and has developed dollies of this type having a plurality of wheels mounted on one or more star-shaped plates which rotate freely about the main axle and contain a number of wheels mounted on stub axles on the legs of the plates. Examples of this art may be seen in Whitaker U.S. Pat. No. 3,058,754 and Loam U.S. Pat. No. 2,736,564. The theory of operation of this prior art is that if at least one pair of the wheels is in contact with a land area of the successive stairs at all times the device will be able to more or less "climb" the steps and avoid the jolting sort of operation with the earlier prior art. Whitaker U.S. Pat. No. 3,326,563 also discloses what might be termed shock absorber means to minimize the jolting in addition to the star plate type arrangement.

Schafer U.S. Pat. No. 849,270 is believed pertinent in disclosing spider or star frames held in position on opposite sides of the main axle with the frames being capable of revolving about the shaft carrying the wheels.

Loam U.S. Pat. No. 2,736,564 also is pertinent in that it discloses star-like members which carry wheels thereon.

Ruhr U.S. Pat. No. 672,152 is pertinent in that it does disclose a rigid locking member or catch operative from adjacent the top to move the yoke of the auxiliary wheel into or out of operative position.

Ridgway U.S. Pat. No. 843,034 also discloses a lever capable of forcing certain fingers into engagement with notched wheels so as to lock the frame to its rotatable supporting beams.

Hollowood U.S. Pat. No. 1,807,913 discloses a hand truck having an auxiliary wheel which assists in ascending or descending stairs.

Smith U.S. Pat. No. 1,969,048 also discloses utilization of more than one pair of wheels for assistance in moving over ordinary obstructions.

Gemeinhardt U.S. Pat. No. 2,689,742 discloses small auxiliary wheels to assist in climbing stairs.

Whitaker U.S. Pat. No. 3,058,754 shows a star plate arrangement for assistance in stair climbing.

Miller U.S. Pat. No. 3,788,413 dicloses the utilization of small auxiliary wheels capable of assisting in the ascending or descending operation.

Achee U.S. Pat. No. 2,651,525 discloses a rigidly mounted auxiliary wheel arrangement.

Marshall U.S. Pat. No. 2,706,640 again shows a star plate arrangement.

Whitaker U.S. Pat. No. 3,326,563 is another illustration of a conventional star plate.

Soto U.S. Pat. No. 3,346,269 also discloses a star plate arrangement with means for controlling the rotation of the star assemblies.

It has been found, however, that difficulties still are presented particularly when descending with heavy loads in that the plates which carry the wheels in the known prior art are normally "free wheeling" in that they simply turn about the main axle and there is a tendency for the truck to pull away from the operator, by virtue of the forces of gravity and the momentum build-up as the vehicle descends the stairs. This presents problems to the operator who must resist these forces and also presents safety problems in the event the operator loses control.

While some of the prior art referred to above does disclose means for preventing this rotation, none of the art, in fact, discloses flexible hand-operated braking means which can be applied selectively and in increments to either completely stop movement or to impede it.

SUMMARY OF THE INVENTION

It has been found that the aforementioned disadvantages of the known prior art can be obviated by providing brake means operable from the handle end of the vehicle to stop or slow down the movement of the main axle and thereby either completely stop or retard the tendency of the plates to "free wheel" and in this fashion to serve effectively as a brake upon the vehicle.

Thus, it has been found that a disc can be secured to the main axle with a flexible band placed around its periphery. The band can then be secured to a lever arm which is, in turn, connected to an operating grip on the handle end of the truck so that the band can be selectively drawn into close engagement with the disc to prevent rotation of the axle and the plates.

Production of an improved hand truck of the character above-described accordingly becomes the principal object of this invention with other objects thereof becoming more apparent upon a reading of the following brief specification considered and interpreted in view of the accompanying drawings.

OF THE DRAWINGS:

FIG. 1 is a side elevational view of the improved hand truck.

FIG. 2 is a rear elevational view thereof.

FIG. 3 is a partial sectional view taken along the line 3—3 of FIG. 2.

FIG. 6 is a partial sectional view taken along the line 6—6 of FIG. 3.

BRIEF DESCRIPTION OF THE PREFERRED EMBODIMENT

Figure 5:
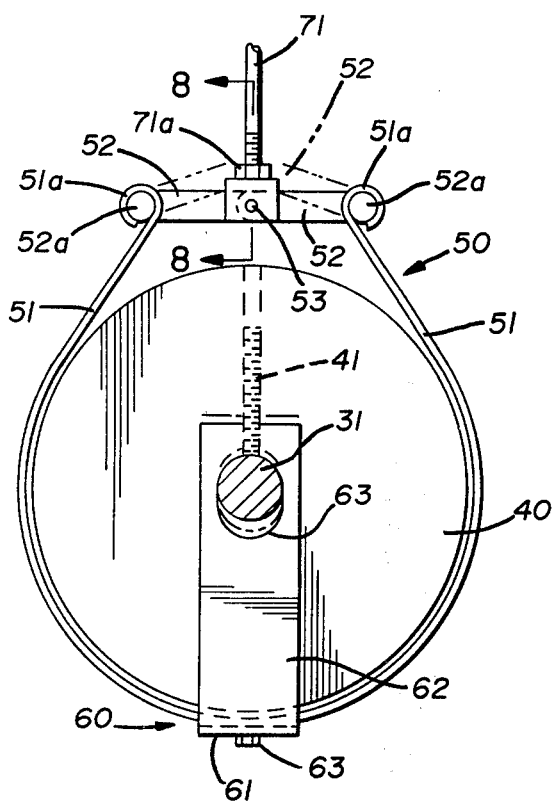
FIG. 5 is an enlarged fragmentary view of the brake means.
Figure 4:
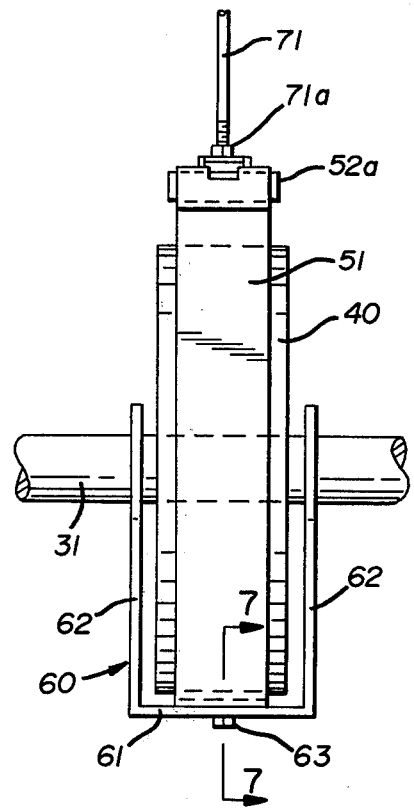
FIG. 4 is a partial sectional view taken along the line 4—4 of FIG. 3.

Referring first then to FIGS. 1 and 2, the improved hand truck, generally indicated by the numeral 10, includes a main frame 20 which comprises a plurality of elongate side frame members 21,21 interconnected by a top frame member 22, intermediate transverse frame members 23,23 and a bottom load carrying member 24. This basic frame structure will not be described in great detail since it is very common and well known in the art and, in fact, is shown in many of the patents referred to above with minor variations.

Handle members 26,26 project from the top of the auxiliary side frame members 25,25 and wheel carrying frame members 27,27 project rearwardly from the brackets 28,28 which are secured to the auxiliary side frame members 25,25 all of which is also conventional.

A main axle 31 is journaled in suitable bearing housings 29,29 on the auxiliary frame members 27,27 and has pinned to it a pair of opposed star-like plates 30,30 each having a plurality of projecting legs. These plates are pinned or keyed to the axle 31 for movement therewith in known fashion.

On the outboard ends of each of the legs of the plates 30,30 are a plurality of stub axles 33,33 each of which carries wheels 32,32 which are independently rotatable about the stub axles.

Also, secured to main axle 31 is a circular disc 40 which is held in place by set screw 41 so that it will move with the main axle 31. Of course any other suitable attachment means could be employed such as, for example, a key and keyway.

Surrounding the periphery of disc 40 is a disc engaging assembly 50 comprising two bands 51,51 of spring steel or some similar material each of which essentially encircles half of the circumference of the disc 40 (See FIG. 5).

A U-shaped support 60 is also provided with this support having a base 61 and upstanding legs 62,62. These legs each have an elliptical aperture 63 adjacent their top ends which are of suitable size so as to be freely journaled on the main axle 31. In this way support 60 will not interfere with rotation of axle 31 in normal operation.

The bands 51,51 have their bottom ends (See FIG. 7) overlapped and secured to the base 61 of the support 60 by means of the screw 63. In this regard each band has a notch 51b,51b in its end forming a reduced thickness terminal portion so that the ends may overlap. This is helpful to the operation of the device because, when the bands are drawn into contact with disc 41, substantially full peripheral contact is achieved.

Also, each band has a suitable aperture 51c,51c in this end for reception of screw 63 so that the ends of the bands may be secured to each other and to support 60. Securing bands 51,51 to support 60 ensures that the bands will normally remain spaced from the periphery of disc 40 and also serves to retain them in their proper alignment with disc 40.

The opposed ends of the bands 51,51 are bent back upon themselves as at 51a,51a for attachment to bars 52,52. In this regard, ends 51a,51a are bifurcated (See FIG. 6) and are wrapped around pins 52a,52a which are carried by bars 52,52. The attachment is secure enough to prevent inadvertent removal but will not impede relative pivotal movement as will be described.

Secured adjacent the upright or vertical frame members of the truck is a cable sheath 70 which encloses a flexible cable 71 movable therewithin with the sheath 70 being secured to the frame by a bracket 72. The top end of the cable terminates in and is connected to a hand grip 80 which is pivotably secured to mounting bracket 80a on one of handles 26 and which is capable upon being squeezed toward the handle 26 thus pulling the cable 72 in the direction of the arrow 90.

The opposed end of cable 71 is secured by an intermediate linkage to bars 52,52 so that when the grip 80 is squeezed the cable will move the arms 52,52 from the full to broken line positions of FIG. 5.

Figure 8:
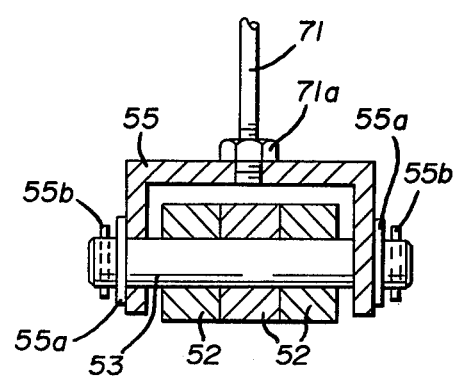
FIG. 8 is a sectional view taken along the line 8—8 of FIG. 5.

In this regard, and referring to FIGS. 5 and 8, it will be noted that bars 52,52 are joined together at their ends for relative pivotal movement. Thus, one bar has a bifurcated end or yoke such as 52c and the other has a tongue 52d thereby forming a clevis type arrangement. A pin 53 joins these parts together and also joins them to bracket 55 with bars 52,52 and bracket 55 being held together by the usual washers 55a,55a and cotter pins 55b,55b.

The base of bracket 55 receives the end of cable 71 which is threaded and held in place by nut 71a.

Therefore, when the cable is pulled in the direction of arrow 90 by squeezing handle 80 the bracket 55 also moves in that direction. This will cause the ends 51a and 51a of the bands 51,51 and frame 60 to be pulled in the direction shown in broken lines in FIG. 5 and the bands 51,51 to be wrapped securely about the periphery of the disc 40. This will tend to prevent rotation of the disc 40 and, since the disc is fixed to the main axle 31, to prevent movement of that axle. In turn, of course, this will tend to prevent movement of the star-like plates 30,30 and will, therefore, effectively serve as a brake to prevent the plates 30,30 from "free wheeling" and getting away from the operator.

In this fashion, the operator may selectively slow up his speed as he descends steps and control the momentum of the truck.

Releasing the grip 80 permits the loosening of the bands 51,51, which will return to their original position by virtue of their inherent resiliency, and free rotational movement of disc 40, axle 31 and plates 30,30 so that on a level surface or when ascending steps the brake in no way impedes the movement of the truck or in any way minimizes or diminishes its stair climbing capabilities.

Similarly, when operating on a level surface the brake would presumably normally be released thereby permitting normal functioning of the truck.

An added advantage of the invention is that trucks of this nature, employing the star-like plates, while working well on stairs and in straight line movement are sometimes somewhat difficult to negotiate around corners or curves because of the fact that effectively four wheels are received on the supporting surface instead of two in the conventional truck. It is, however, possible by means of this device to lock the plates in such a position that only two wheels are on the supporting surface thereby permitting the vehicle to be used on a level surface much as conventional hand trucks while preserving the unique stair ascending and descending capabilities.

There are other advantages to the unique construction disclosed herein.

For example, it is a relatively simple matter to change the bands 51,51. All that is required is to remove the pin 53 and remove the curved ends 51a,51a from the pins 52a,52a on arms 52,52. The bands themselves could then be readily replaced.

Figure 7:
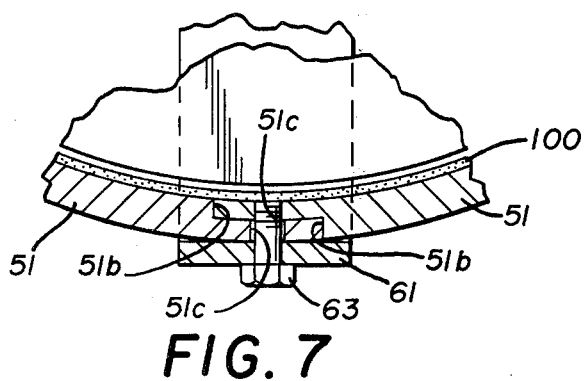
FIG. 7 is a sectional view taken along the line 7—7 of FIG. 4.

It is also possible, if desired, for still greater braking efficiency to coat one surface of bands 51,51 with an abrasive or non-slip material 100 (See FIG. 7). This would improve the gripping effect between bands 51,51 and disc 41.

While a full and complete description of the invention has been set forth in accordance with the dictates of the Patent Statutes, it should be understood that modifications can be resorted to without departing from the spirit hereof or the scope of the appended claims.

For example, while a frame 20 illustrates one typical type of truck and is described in general terms it should be understood that the basic invention described herein could be used on other designs of hand trucks.

Similarly while a six wheel (three wheels on each plate) arrangement has been illustrated, it is believed that the braking mechanism and the advantages obtained thereby in combination with a stair climbing vehicle could be obtained with more or less than three wheels if desired.

What is claimed is:

1. In combination with a hand truck having elongate frame members and opposed wheel bearing plates journaled on an axle carried by said frame members the improvement comprising;
   (A) disc means fixed to the axle;
   (B) rotation inhibiting means carried by the axle in at least partially encircling and normally non-contacting relationship with said disc means;
   (C) actuating means
      (1) carried by one of the frame members and
      (2) attached to said rotation inhibiting means
      (3) for drawing said rotation inhibiting means into frictional engagement with said disc means; and
   (D) said rotation inhibiting means including
      (1) a mounting bracket carried by the axle for limited movement in a plane normal to the longitudinal axis of the axle and
      (2) flexible band means secured to said mounting bracket.

2. The improvement of claim 1 wherein said flexible band means include two bands having first and second ends with said second ends being releasably secured to said mounting bracket.

3. The improvement of claim 1 further characterized by the presence of a pivoting linkage interconnecting said actuating means and said flexible band means; said linkage including a pair of bars; said first ends of said bands each being attached to one of said bars; and said bars being interconnected for pivotal movement relatively of each other.

4. The improvement of claim 3 wherein said actuating means include
   (A) an elongate cable;
   (B) a handle secured to one end of said cable and to one of the frame members; and
   (C) the opposed end of said cable being secured to said bars.

5. The improvement of claim 1 further characterized by the presence of a layer of abrasive material on the face of said band means facing said disc.

6. In combination with a hand truck having elongate frame members and opposed wheel bearing plates journaled on an axle carried by said frame members, the improvement comprising;
   (A) a disc fixed to the axle;
   (B) a mounting bracket carried by the axle;
   (C) flexible band means
      (1) secured to said mounting bracket and
      (2) at least partially encircling the periphery of said disc in normally non-contacting relationship therewith;
   (D) actuating means carried by said frame members and including
      (1) an elongate cable
      (2) a handle secured to one end of said cable and to said frame members and
      (3) a pivoting linkage interconnecting the remaining end of said cable and said band means; and
   (E) said pivoting linkage including a pair of bar members
      (1) pivotally interconnected to each other,
      (2) connected to said remaining end of said cable and
      (3) releasably attached to said band means.

7. The improvement of claim 6 wherein said flexible band means are releasably secured to said mounting bracket.

8. The improvement of claim 6 wherein said flexible band means include a pair of opposed bands each having one end secured to said mounting bracket and their opposed ends secured to said bar members.

9. The improvement of claim 6 wherein said mounting bracket is carried by the axle for limited movement in a plane normal to the longitudinal axis of the axle.

10. The improvement of claim 6 further characterized by the presence of a layer of abrasive material on the face of said band means facing said disc.